United States Patent
Alexander

(10) Patent No.: US 6,752,930 B2
(45) Date of Patent: Jun. 22, 2004

(54) CHLORINATION APPARATUS AND METHOD

(76) Inventor: Peter L. Alexander, 348 N. Park Ave., Winter Garden, FL (US) 34787

( * ) Notice: Subject to any disclaimer, the term of this patent is extended or adjusted under 35 U.S.C. 154(b) by 96 days.

(21) Appl. No.: 10/121,217

(22) Filed: Apr. 11, 2002

(65) Prior Publication Data

US 2002/0170853 A1 Nov. 21, 2002

Related U.S. Application Data

(60) Provisional application No. 60/292,129, filed on May 18, 2001.

(51) Int. Cl.[7] .............................. C02F 1/76; B01J 19/24
(52) U.S. Cl. ....................... 210/739; 210/746; 210/749; 210/754; 210/756; 210/143; 210/169; 210/198.1; 422/3; 422/105; 422/110
(58) Field of Search ................................ 210/739, 746, 210/753, 754, 749, 756, 758–760, 94, 143, 169, 170, 198.1, 747; 422/3, 37, 105, 110, 256

(56) References Cited

U.S. PATENT DOCUMENTS

| | | | |
|---|---|---|---|
| 2,999,797 A | * 9/1961 | Campbell | 210/748 |
| 3,352,628 A | * 11/1967 | Starbuck | 422/4 |
| 3,448,045 A | * 6/1969 | Hess et al. | 210/760 |
| 3,672,508 A | 6/1972 | Simon | |
| 3,804,253 A | 4/1974 | Wellman et al. | |
| 3,918,469 A | * 11/1975 | Zamboni et al. | 137/5 |
| 3,928,197 A | 12/1975 | Horan et al. | |
| 4,033,871 A | 7/1977 | Wall | |
| 4,056,470 A | * 11/1977 | Carpenter | 210/94 |
| 4,224,154 A | 9/1980 | Steininger | |
| 4,259,269 A | * 3/1981 | Flowers | 261/151 |
| 4,300,909 A | 11/1981 | Krumhansl | |
| 4,363,728 A | 12/1982 | Guglielmi et al. | |
| 4,596,648 A | 6/1986 | Sweeney | |
| 4,657,670 A | 4/1987 | Newton | |
| 4,767,511 A | 8/1988 | Aragon | |
| 4,781,810 A | 11/1988 | Tucker | |
| 4,818,416 A | * 4/1989 | Eberhardt | 210/749 |
| 4,820,408 A | 4/1989 | Sandig | |
| 5,019,250 A | * 5/1991 | Lorenzen | 210/85 |
| 5,025,822 A | * 6/1991 | Guggisberg | 137/1 |
| 5,061,377 A | * 10/1991 | Lee et al. | 210/752 |
| 5,236,673 A | * 8/1993 | Coakley et al. | 422/186.07 |
| 5,313,268 A | 5/1994 | Doll | |
| 5,453,207 A | * 9/1995 | Simpson et al. | 210/739 |
| 5,827,959 A | 10/1998 | Clanin | |
| 6,132,629 A | * 10/2000 | Boley | 210/760 |
| 6,270,680 B1 | 8/2001 | Silveri et al. | |
| 6,337,024 B1 | * 1/2002 | Hammonds | 210/739 |

* cited by examiner

Primary Examiner—Fred G. Prince
(74) Attorney, Agent, or Firm—Terry M. Sanks, Esquire; Beusse Brownlee Wolter Mora & Maire, P.A.

(57) ABSTRACT

An apparatus for providing a solute to a solvent, the apparatus comprising a feed line where the feed line comprises a mixer-injector having at least a body with a carrier stream inlet, an additive stream inlet, and an outlet, a metering valve for controlling an amount of solute to supply to the solvent, a flow meter to determine the amount of solute to supply to the solvent, a strainer to remove a foreign substance from the solute, a cleanout valve, an additive feed line, a solenoid valve to control when a release of the solute to the flow meter is made, and a shut-off valve to prevent the release of said solute to the solvent.

19 Claims, 2 Drawing Sheets

CHLORINATION APPARATUS AND METHOD

This application claims priority of Provisional Patent Application Serial No. 60/292,129, filed on May 18, 2001.

BACKGROUND OF THE INVENTION

This invention relates to a swimming pool, and more specifically to an apparatus for supplying water purification chemicals to a swimming pool. Thus, the term "swimming pool" can apply to any body of water. This invention is to be used with liquid solutes. Again, though this invention is being described with respect to a swimming pool and applying chlorination to the swimming pool, other chemicals can also be used with this invention. With reference to the figures, exemplary embodiments of the invention will now be described.

In order to provide for safe, sanitary water used in a swimming pool, chlorination systems are provided to eliminate bacteria and algae that may endanger a swimmer's health. Many systems have been designed for introducing chemicals such as chlorine into a swimming pool's water supply to provide such safety. The systems used to provide these chemicals are generally some form of pumping system. The larger the pool, the more complex or large is the pumping system. Towards this end, many public facilities, which are generally Olympic-size swimming pools, or the like, require a pump that will effectively provide the needed chemicals, such as chlorine, into a water supply. These mechanical pumps are complex pieces of equipment, since they include many moving parts, and must be able to continuously pump additional chlorine as the need arises.

SUMMARY OF THE INVENTION

Towards this end, swimming pool maintenance people would benefit from a chlorination apparatus and method which would eliminate the need for pumping chlorine into a water supply. An apparatus with little to no moving parts, where chlorine is sucked, or drawn into a pool's water supply would be preferable.

The present invention discloses an apparatus for providing a solute to a solvent. The apparatus comprises a feed line where the feed line comprises a mixer-injector having at least a body with a carrier stream inlet, an additive stream inlet, and an outlet. The feed line also comprises a metering valve for controlling an amount of solute to supply to the solvent and a flow meter to determine the amount of solute being supplied to the solvent. The apparatus also has a strainer to remove a foreign substance from the solute, a cleanout valve, and an additive feed line. The apparatus also comprises a solenoid valve to control when a release of the solute to the flow meter is made, and a shut-off valve to prevent the release of the solute to the solvent.

The present invention also comprises a method for introducing a chemical into a body of water. The method comprises supplying water for entry into a body of water through a mixer-injector comprising a carrier stream inlet, an additive stream inlet, and an outlet. The method further comprises allowing a controller to detect a decrease in a chemical in the swimming pool. If a decrease in the chemical is detected, the method allows the controller to open a solenoid valve allowing the chemical to flow to the mixer-injector for mixture with the body of water. The method also provides for a flow meter controllable by a flow meter valve to establish an amount of the chemical to flow to said mixer-injector.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The scope of the invention disclosed is applicable to a plurality of instances where one chemical, or solute, is mixed with another chemical or solvent. Thus, even though this invention is disclosed al being illustrated for a swimming pool, this invention is applicable to other uses where a solute is mixed into a solvent, such as pottable water.

Figure 1:
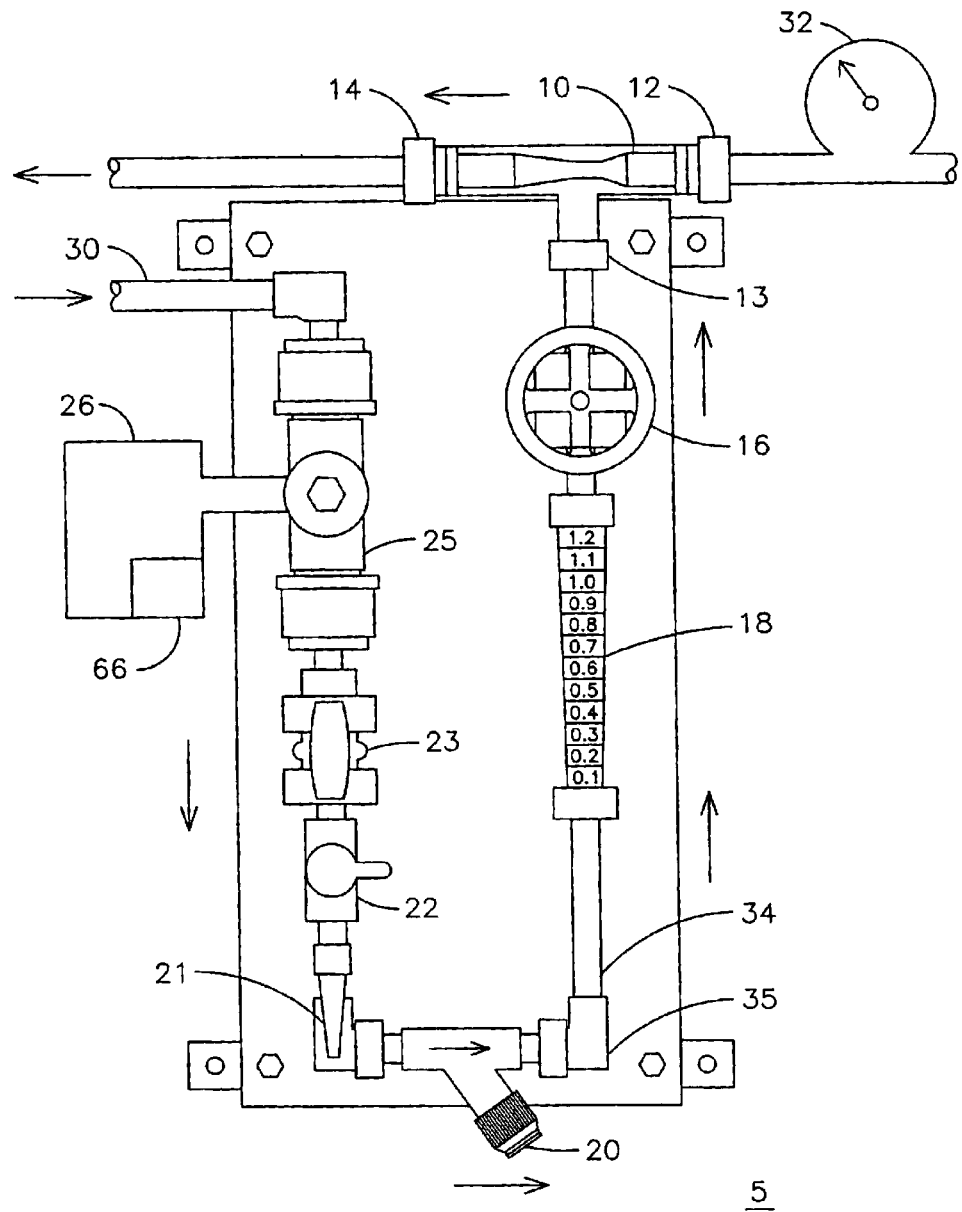
FIG. 1 is an exemplary embodiment of a preferred embodiment of the present invention.

FIG. 1 is an exemplary embodiment of a preferred embodiment of the present invention. This invention 5 has a venturi, more specifically, a mixer-injector 10 having at least a body with a carrier stream inlet 12, an additive stream inlet 13 and an outlet 14. Connected to the additive stream inlet 13 is a metering valve 16. The metering valve 16 is used to set a flow rate of a chemical that is flowing into the additive stream inlet 13. A flow meter 18 is attached to the metering valve 16, where in a preferred embodiment, the flow meter 18 discloses measurements, such as gallons per minute, so that a user can set a desired flow rate. Also in a preferred embodiment, the flow meter 18 has a float (not shown), which rises as chlorine enters the flow meter 18, so that an operator can visibly see the rate chlorine is being fed into the pool water. In another preferred embodiment, an electronic measuring device is used to determine a flow rate for chlorine, or another solute.

As illustrated, the present invention has a "U" shape. The present invention is mounted vertically, such as on a wall, or a board that is then mounted on a wall where the base of the "U" shaped invention is at a low point. In the base of the "U" shaped invention is a strainer 20, such as a wye strainer. The strainer 20 is provided to remove any foreign contaminants that may have been introduced into the invention before the contaminant can reach the mixer-injector 10. In another preferred embodiment, the strainer 20 is either not provided or is located at a different position within the invention 5. A cleanout valve 22, such as a labcock valve, is also provided, as well as a shutoff valve 23.

The shutoff valve 23 and cleanout valve 22 are used to allow a user to clean the apparatus 5. In operation, a user can position the shutoff valve 23 to prevent additional solute from flowing to the mixer-injector 10, and then open the cleanout valve 22 to allow a rinsing solution and/or solution to flow through to the mixer-injector 10 to clean the invention 5. In a preferred embodiment, this is accomplished by connecting a hose (not shown) to the cleanout valve 22, on a fitting end 21 such as a barbed end, which is then fed into a container of cleaning solution (not shown). The suction generated by the mixer-injector 10 would then allow the cleaning solution and/or rinsing solution to flow up through the cleanout valve 22 and through the invention 5, thus cleaning the invention 5.

In a preferred embodiment, the hose is first fed into a container of water rinsing the invention free of solute. The hose is then fed into a container of cleaning solution so that the invention is cleaned. Next the hose is again fed into a container of water rinsing the cleaning solution from the invention, thus preventing a mixture of the cleaning solution with the solute.

A solenoid valve 25 is also provided in the invention. The solenoid valve 25 is connected, in a preferred embodiment electrically to a controller 26, such as a microprocessor. The controller 26 will control when additional solute should be entered into a solvent. With respect to a swimming pool, in a preferred embodiment electrical probes 66 are provided, which detect the amount of solute, such as chlorine, in a swimming pool. These probes measure an electrical charge of the chlorine. When the chlorine level is below an acceptable level, the probe relays this information to the controller 26, which is monitoring the probe's data. The controller 26 will then activate the solenoid valve 25, which would then allow additional chlorine to flow through the chlorine line 30, through the invention 5 and into the swimming pool. As further illustrated, a pressure meter 32 is also provided. The pressure meter 32 is used to measure the water pressure before the water enters the mixer-injector 10. In a preferred embodiment, if the water pressure below a certain level, such as 25 pounds per square inch (PSI), the mixer-injector 10 may be unable to adequately draw the chlorine through the apparatus 5 and into the water outlet 14.

Each component 10, 16, 18, 20, 22, 23, 26, 30, 32 described above is constructed of corrosive-resistant material. Additionally between each component discussed above is piping 34 and joints 35, which connects the components 10, 16, 18, 20, 22, 23, 26, 30, 32 together, also made of non-corrosive material. The chlorine discussed above is a liquid, such as sodium hypochlorite. However, the present invention is also applicable to other liquid chemicals.

Figure 2:
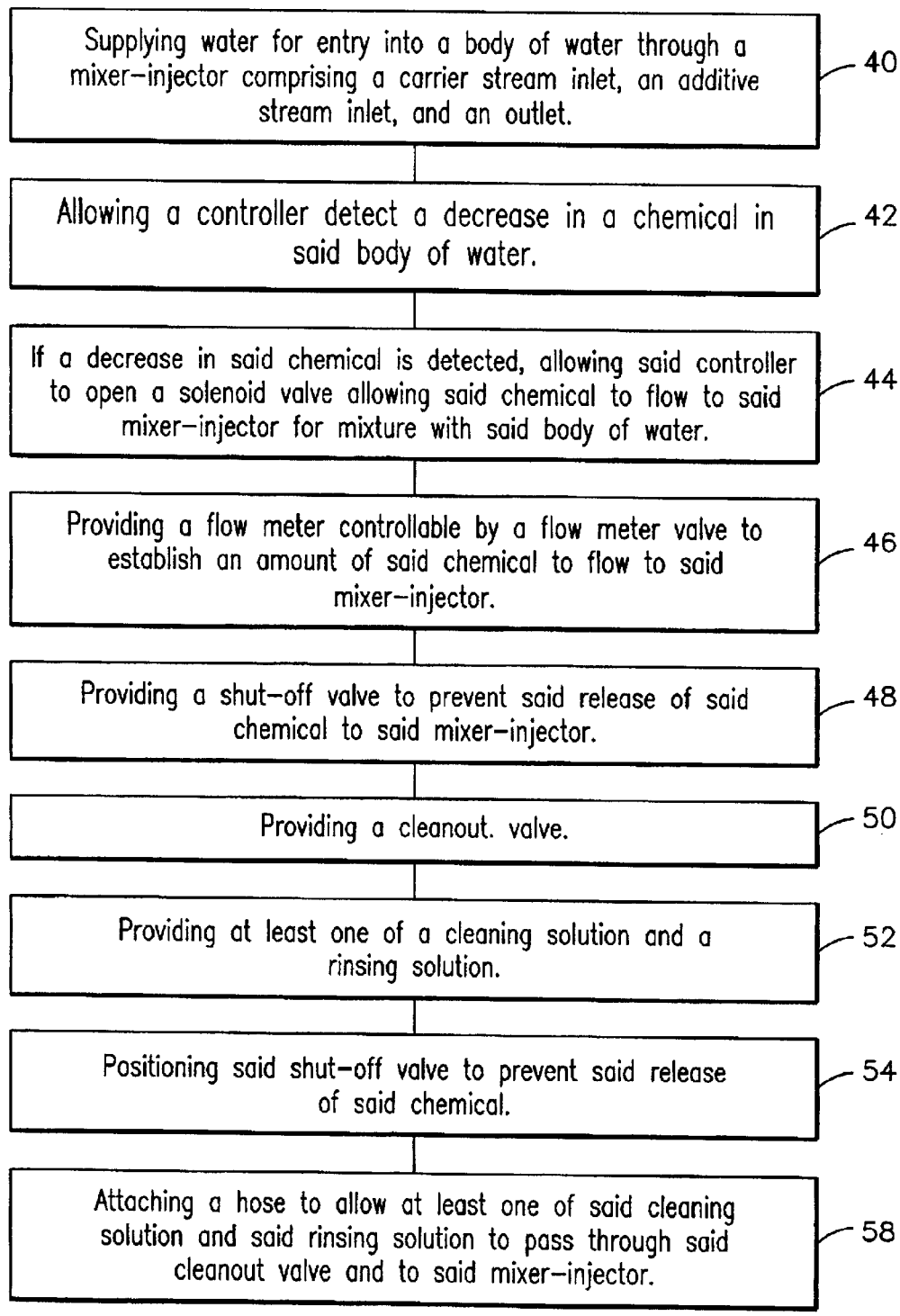
FIG. 2 is an exemplary embodiment illustrating steps that may be taken to chlorinate a body of water.

FIG. 2 is a preferred embodiment of a method for introducing a chemical into a body of water. Water is supplied to a body of water, but it first passes through a mixer-injector step 40. The controller is provided to detect a decrease in a chemical in the swimming pool step 42. If a decrease is detected, the controller will open a solenoid valve, allowing additional chemical to flow to the mixer-injector for mixture with the body of water being provided to the swimming pool step 44. The flew of the chemical to the mixer-injector is controlled by a flow meter valve, which is set based on a certain flow, which can be determined by looking at a flow meter step 46. This method further comprises providing a shuttoff to prevent a release of the chemical to the mixer-injector step 48, and providing a cleanout valve step 50. Thus, once the shutoff valve is positioned to prevent the release of the chemical step 54, a hose is attached to the cleanout valve on the fitting end Step 58, where the rinsing/cleaning solution Step 52 is then passed through the cleanout valve and to the mixer-injector step 58.

While this invention has been directed in what is presently considered to be a preferred embodiment, many variations and modifications will become apparent to those skilled in the art. Accordingly, it is intended that the invention not be limited to the specific illustrative embodiment, but be interpreted within the full spirit and scope of the appending claims.

What is claimed is:

1. A swimming pool purification apparatus, said apparatus comprising a feed line comprising:
   a. a mixer-injector having at least a body with a carrier stream inlet, an additive stream inlet, and an outlet;
   b. a metering valve where a first end is connected to said additive stream inlet of said mixer-injector;
   c. a flow meter where a first end is connected to a second end of said metering valve;
   d. purification additive feed line for a purification additive;
   e. a solenoid valve connected to said additive feed line;
   f. a controller connected to said solenoid valve;
   g. wherein said controller activates said solenoid valve to allow said purification additive to be added to said water and said controller detects a decrease in said purification additive.

2. The apparatus of claim 1 wherein said apparatus has a U-shape and said mixer-injector is positioned above a base of said U-shape.

3. The apparatus of claim 1 wherein said apparatus is mounted in a vertical direction.

4. The apparatus of claim 1 further comprising a strainer where a first end is connected to a second end of said flow meter and said strainer is in said base of said U-shape apparatus.

5. The apparatus of claim 1 further comprising a pressure meter to determine a pressure of water before said purification additive is added.

6. The apparatus of claim 1 further comprising a cleanout valve.

7. The apparatus of claim 6 further comprising a probe connected to said controller to measure an amount of purification additive in a swimming pool.

8. The apparatus of claim 1 wherein a shutoff valve is positioned to prevent said purification additive from entering a water supply being fed into said swimming pool.

9. The apparatus of claim 6, wherein said cleanout valve is used to supply at least one of a cleaning solution and a rinsing solution to said apparatus.

10. An apparatus for providing a solute to a solvent, said apparatus comprising a feed line where said feed line comprises:
    a. a mixer-injector having at least a body with a carrier stream inlet, an additive stream inlet, and an outlet;
    b. a metering valve for controlling an amount of solute to supply to said solvent;
    c. a flow meter to determine said amount of solute to supply to said solvent;
    d. a strainer to remove a foreign substance from said solute;
    e. a cleanout valve;
    f. an additive feed line;
    g. a solenoid valve to control when a release of said solute to said flow meter is made; and
    h. a shut-off valve to prevent said release of said solute to said solvent.

11. The apparatus of claim 10 wherein said feed line has a U-shape appearance.

12. The apparatus of claim 11 wherein at least one of said strainer and said solenoid valve is in a base of said U-shaped feed line.

13. The apparatus of claim 10 further comprising a pressure meter to determine a pressure of said solvent before said solute is added.

14. The apparatus of claim 10 further comprising a controller electrically connected to said solenoid valve to activate said solenoid valve to allow said solute to mix with said solvent.

15. The apparatus of claim 14 further comprising a probe connected to said controller to measure an amount of solute in said solvent to allow said controller to determine when additional solute is needed.

16. The apparatus of claim 10 wherein said shutoff valve is positioned to prevent solute from entering said solvent.

17. The apparatus of claim 10 wherein said cleanout valve is used to supply at least one of a cleaning solution and said rinsing solution to said apparatus.

18. A method for introducing a chemical into a body of water, said method comprising:
- a. supplying water for entry into a body of water through a mixer-injector comprising a carrier stream inlet, an additive stream inlet, and an outlet;
- b. allowing a controller to detect a decrease in a chemical in said body of water;
- c. if a decrease in said chemical is detected, allowing said controller to open a solenoid valve allowing said chemical to flow to said mixer-injector for mixture with said body of water; and
- d. providing a flow meter controllable by a flow meter valve to establish an amount of said chemical to flow to said mixer injector;
- e. providing a shut-off valve to prevent said release of said chemical to said mixer-injector;
- f. providing a cleanout valve;
- g. providing at least one of a cleaning solution and a rinsing solution;
- h. positioning said shut-off valve to prevent said release of said chemical; and attaching a hose to allow at least one of said cleaning solution and said rinsing solution to pass through said cleanout valve and to said mixer-injector.

19. The method of claim 18 further comprising providing a pressure meter to determine a pressure of said water before said water enters said mixer-injector.

* * * * *